(12) United States Patent
Itahara (10) Patent No.: US 6,590,462 B1
(45) Date of Patent: Jul. 8, 2003

(54) NOISE CODE STRING GENERATOR AND CN CONTROLLER COMPRISING IT

(75) Inventor: Hiroshi Itahara, Atsugi (JP)

(73) Assignee: Anritsu Corporation, Tokyo (JP)

( * ) Notice: Subject to any disclaimer, the term of this patent is extended or adjusted under 35 U.S.C. 154(b) by 11 days.

(21) Appl. No.: 09/857,860
(22) PCT Filed: Oct. 24, 2000
(86) PCT No.: PCT/JP00/07436
§ 371 (c)(1), (2), (4) Date: Jun. 11, 2001
(87) PCT Pub. No.: WO01/33713
PCT Pub. Date: May 10, 2001

(30) Foreign Application Priority Data

Oct. 29, 1999 (JP) .......................................... 11-309380

(51) Int. Cl.⁷ ............................. H03B 29/00; G06F 7/00
(52) U.S. Cl. ......................................... 331/78; 708/250
(58) Field of Search ........................... 708/250; 331/78; 370/335

(56) References Cited

U.S. PATENT DOCUMENTS 4,142,240 A * 2/1979 Ward et al. .................. 708/250

FOREIGN PATENT DOCUMENTS

| JP | 64-36212 | 2/1989 |
|---|---|---|
| JP | 8-242259 | 9/1996 |
| JP | 11-45173 | 2/1999 |

* cited by examiner

Primary Examiner—Arnold Kinkead
(74) Attorney, Agent, or Firm—Frishauf, Holtz, Goodman & Chick, P.C.

(57) ABSTRACT

In a noise sequence generator, a plurality of memories store plural types of noise sequences that are non-correlated with each other, respectively. A noise sequence readout section reads out the noise sequences stored in the plurality of memories so that the code periods are prime numbers of each other. A sequence-adding section adds the noise sequences read out in parallel from the plurality of memories by means of the noise sequence readout section, thereby outputting the addition result as a series of noise sequences. In a CN controller, a setting section sets a value to determine an amplitude of a digital modulation signal row to a register. A multiplying section multiplies the setting value of the register by the to-be-inputted digital modulation signal row. A CN adding section adds a series of noise sequences outputted from the sequence adding section of the noise sequence generator to an output of the multiplying section, and outputs the addition result.

11 Claims, 6 Drawing Sheets

NOISE CODE STRING GENERATOR AND CN CONTROLLER COMPRISING IT

This application is a U.S. National Phase Application under 35 USC 371 of International Application PCT/JP00/07436 (not published in English) filed Oct. 24, 2000.

TECHNICAL FIELD

The present invention pertains to a noise sequence generator and a CN controller using the generator. More particularly, the present invention relates to a noise sequence generator employing a technique for improving noise level and CN stability relative to time, and a CN controller using the generator.

BACKGROUND ART

In recent years, owing to the digitalization of the communications and broadcasting service industries, a variety of modulation systems are becoming available.

A method for evaluating the performance of equipment such as a digital receiver or a demodulator used in these digital systems includes investigating how a device bit error changes relative to changes in the CN ratio of an input signal.

In the case of performing such measurement, as its signal source, there is employed a reference signal generated by superposing a white Gaussian noise of an arbitrary level N as an interference wave on an ideal modulation signal of an arbitrary level C.

Figure 8:
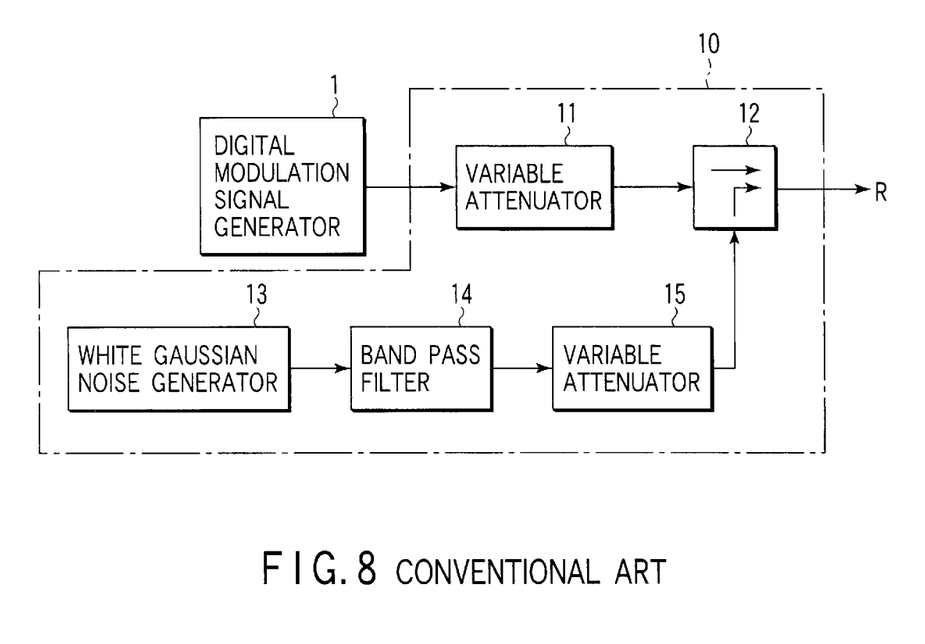
FIG. 8 is a block diagram depicting a configuration of a conventional apparatus.

FIG. 8 shows a conventional reference signal generating system in accordance with an analog approach for generating this reference signal.

This reference signal generating system is composed of a digital modulation signal generator 1 and a CN controller 10.

That is, a digital modulation signal outputted from the digital modulation signal generator 1 in an RF bandwidth (a high frequency bandwidth) or an IF bandwidth (an intermediate frequency bandwidth) is adjusted at an arbitrary level C by means of a variable attenuator 11 of the CN controller 10, and then, the adjusted signal is inputted to one input terminal of a directional coupler 12.

In addition, a white noise signal outputted from a white noise generator 13 is bandwidth-restricted according to a frequency bandwidth of a digital modulation signal by means of a band pass filter 14. In addition, the bandwidth-restricted signal is adjusted to an arbitrary level N by means of a variable attenuator 15, and is then inputted to the other input terminal of the directional coupler 12.

Then, a reference signal R of an arbitrary CN ratio is outputted from this directional coupler 12.

In this reference signal generating system, the CN ratio of the reference signal R can be arbitrarily varied by adjusting the variable attenuators 11 and 15 of the CN controller 10.

The CN ratio (carrier to noise ratio) used here denotes a ratio of a carrier wave level to a noise level in a communication system for modulating and transmitting a carrier wave, as is well known.

In particular, in frequency modulation, it is known that, if the CN ratio is sufficiently large, a frequency deviation caused by noise is extremely small, and the SN ratio after demodulation is much better than a value of the CN ratio.

However, as in the aforementioned conventional CN controller 10, in a system for attenuating a digital modulation signal of an analog type in an RF bandwidth or IF bandwidth and a noise signal of an analog type respectively by an attenuator to be superposed, there has been a problem that the reliability of setting the CN ratio of the reference signal R is low.

That is, in the digital modulation signal generator 1, the digital modulation signal and carrier signal in a base bandwidth are inputted to an quadrature modulator, whereby the digital modulation signal in the RF bandwidth or IF bandwidth is generated.

In this case, under the influence of a level change of a carrier signal or frequency characteristics of the quadrature modulator, the reliability of the level of the digital modulation signal generated by the digital modulation signal generator 1 is lowered, thereby lowering the reliability of the CN ratio of the reference signal set at the CN controller 10.

In addition, the level of a white noise signal outputted from an analog white noise generator 13 is also likely to change with an elapse of time, and the reliability of the CN ratio of the reference signal R is lowered by this change.

In order to solve this problem, it has been considered to superpose a digital white noise sequence onto a baseband digital modulation signal, and then, convert it in the RF bandwidth or IF bandwidth.

However, as described previously, in the case of performing error measurement for evaluation of equipment performance, much time is required (about 10 hours to several days).

In a conventional technique, it has been extremely difficult to digitally generate a noise sequence free of correlation over such a long time.

For example, in the case of reading out a pre-stored noise sequence from a storage medium, in order for a noise sequence to be read out by one cycle within about 12 days when its reading clock is 32 MHz, an address region of about $35 \times 10^{12}$ is required.

In addition, in the case of performing readout in units of 2 bytes (16 bits), a storage medium with a storage capacity of about $70 \times 10^3$ Gigabytes is required.

In the case where an attempt is made to configure such a large scale system with hard disks, 10000 hard disks, each of 7 Gigabytes would be required, and thus, it is extremely difficult to achieve such a configuration.

DISCLOSURE OF INVENTION

The present invention has been made in order to solve the foregoing problem. It is an object of the present invention to provide a noise sequence generator of a simple configuration, for generating a noise sequence whose code period is long, whose level stability is high, and which is close to a Gaussian normal distribution; and a CN controller capable of increasing the reliability of the CN ratio of a reference signal relevant to the CN ratio set by using this noise sequence generator.

In order to achieve the foregoing object, according to a first aspect of the present invention, there is provided a noise sequence generator comprising:

a plurality of memories (31a, 31b, 31c, 32a, 32b, and 32c) storing plural types of noise sequences that are non-correlated with each other, respectively;

noise sequence readout means for reading out the noise sequences stored in the plurality of memories so that their code periods are prime numbers each other; and sequence adding means (38, 39) for adding noise sequences read out from the plurality of memories in parallel by the noise sequence readout means, thereby outputting the addition result as a series of noise sequences.

In addition, in order to achieve the foregoing object, according to a second aspect of the present invention, there is provided a CN controller comprising:

a register (23);

setting means (24) for setting a value to determine an amplitude of a digital modulation signal row to the register;

multiplying means (21, 22) for multiplying the setting value of the register by a to-be-inputted digital modulation signal row;

a plurality of memories (31a, 31b, 31c, 32a, 32b, and 32c) storing white Gaussian noise sequences that are non-correlated with each other, respectively;

noise sequence readout means for reading out the noise sequences stored in the plurality of memories so that their code periods are prime numbers of each other (37);

sequence adding means (38, 39) for adding noise sequences read out in parallel from the plurality of memories by the noise sequence readout means, thereby outputting the addition result as a series of noise sequences; and CN adding means (25, 26) for adding and outputting a series of noise sequences outputted from the sequence adding means to an output from the multiplying means.

In addition, in order to achieve the foregoing object, according to a third aspect of the present invention, there is provided a CN controller comprising:

a plurality of memories (31a, 31b, 31c, 32a, 32b, and 32c) storing white Gaussian noise sequences that are non-correlated with each other, respectively;

noise sequence readout means for reading out the noise sequences stored in the plurality of memories so that their code periods are prime numbers of each other (37);

sequence adding means (38, 39) for adding noise sequences read out in parallel from the plurality of memories by the noise sequence readout means, thereby outputting the addition result as a series of noise sequences;

a register (23);

setting means (24) for setting a value to determine an amplitude of the series of noise sequences to the register;

multiplying means (21, 22) for multiplying the setting value of the register to the series of noise sequences outputted from the sequence adding means; and CN adding means (25, 26) for adding a to-be-inputted digital modulation signal row to an output from the multiplying means, and outputting the addition result.

In addition, in order to achieve the foregoing object, according to a fourth aspect of the present invention, there is provided a CN controller comprising:

a noise sequence generator (30) comprising:

a plurality of memories (31a, 31b, 31c, 32a, 32b, and 32c) storing a plurality of sequences that are non-correlated with each other, respectively;

noise sequence readout means for reading out a plurality of noise sequences stored in the plurality of memories so that their code periods are prime numbers of each other (37); and sequence adding means (38, 39) for adding a plurality of noise sequences read out in parallel from the plurality of memories by the noise sequence readout means, thereby outputting the addition result as a series of noise sequences; and CN control means (21, 22, 23, 24, 25, and 26) for receiving the series of noise sequences outputted from the sequence adding means of the noise sequence generator at one end, and receiving a digital modulation signal row to be CN controlled at the other end, thereby applying a predetermined CN control to the to-be-CN controlled digital modulation signal row based on the series of noise sequences.

BEST MODE FOR CARRYING OUT OF THE INVENTION

Hereinafter, one embodiment of the present invention will be described with reference to the accompanying drawings.

Figure 1:
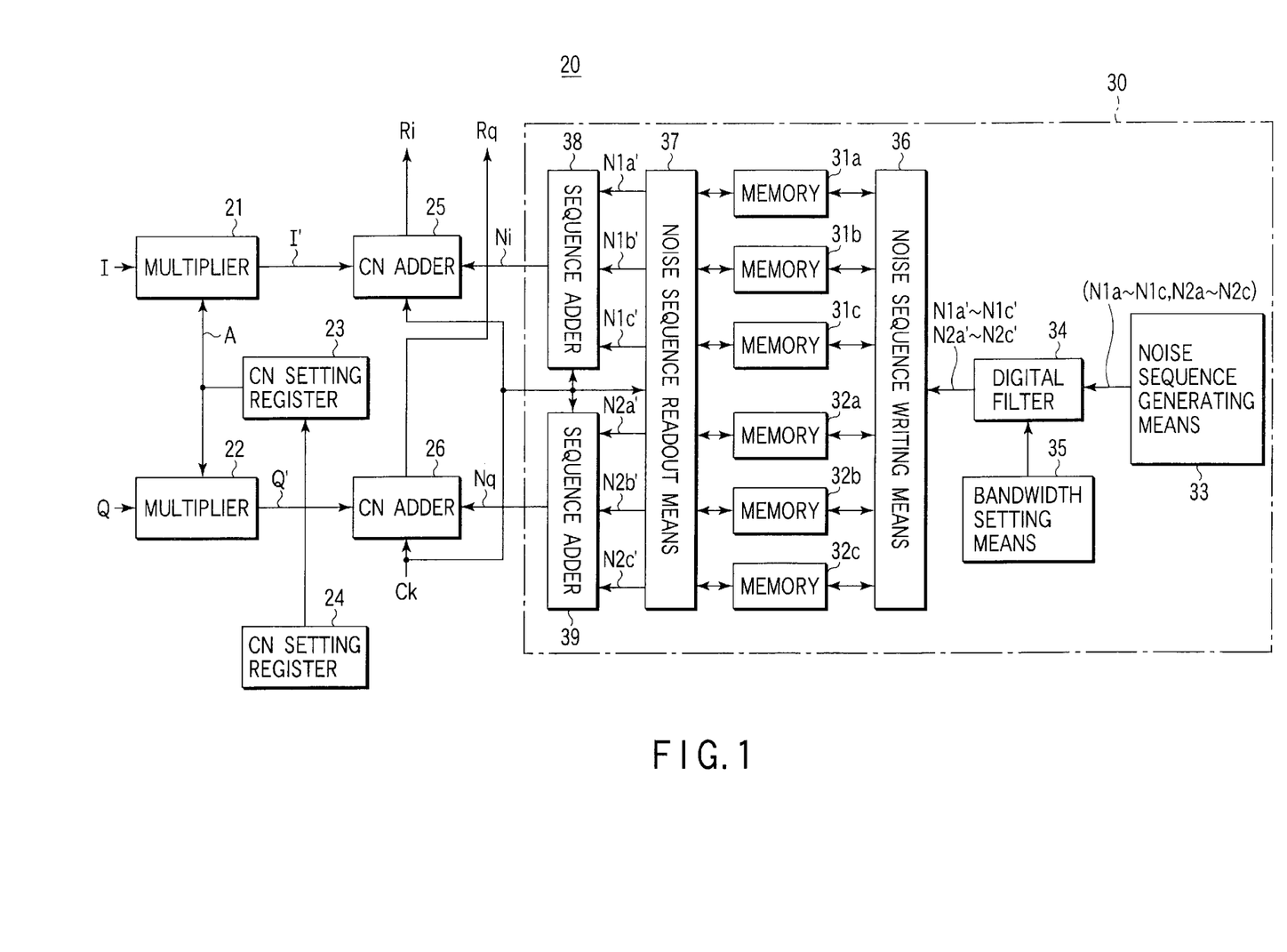
FIG. 1 is a block diagram depicting a configuration of a CN controller according to one embodiment of the present invention.

FIG. 1 is a block diagram depicting a configuration of a CN controller 20 according to one embodiment of the present invention.

This CN controller 20 configures a measurement signal generating system together with a digital modulation signal generator or the like (not shown).

In FIG. 1, multipliers 21 and 22 multiply, for example, baseband digital modulation signal rows I and Q inputted in units of 16 bits and a setting value A of a CN setting register 23 with each other from a digital modulation signal generator (not shown).

To this CN setting register 23, an arbitrary value A for determining an amplitude C of a digital modulation signal to be inputted is set by CN setting means 24.

Then, outputs I' and Q' from the multipliers 21 and 22 are inputted respectively to the CN adders 25 and 26.

The CN adder 25 digitally adds a digital modulation signal row I' to a noise sequence Ni outputted from a noise generating section 30, thereby outputting the addition result as a reference signal Ri.

In addition, the CN adder 26 digitally adds a digital modulation signal row Q' and a noise sequence Nq outputted from the noise generating section 30, thereby outputting the addition result as a reference signal Rq.

On the other hand, the noise sequence generating section 30 configures a noise sequence generator according to the present invention.

This noise sequence generating section 30 is composed of: memories 31a, 31b, 31c, 32a, 32b, and 32c; a noise sequence generating means 33 for generating six types and three pairs of noise sequences (N1a, N2a), (N1b, N2b), and (N1c, N2c); a digital filter 34 for adding a bandwidth restriction to each noise sequence generated by this noise sequence generating means 33; bandwidth setting means 35 for setting a bandwidth of this digital filter 34; noise sequence writing means 36 for writing each of the noise sequences N1a', N1b', and N1c' and each of the noise sequences N2a', N2b', and N2c' bandwidth-restricted by the digital filter 34 into each of the memories 31a, 31b, and 31c and each of the memories 32a, 32b, and 32c, respectively; noise sequence readout means 37 for reading out each of the noise sequences stored in each of the memories 31a, 31b, and 31c and each of the memories 32a, 32b, and 32c in parallel and cyclically; a sequence adder 38 for digitally adding three types of noise sequences N2a', N2b', and N2c' of the noise sequences read out by the noise sequence readout means 37; and a sequence adder 39 for digitally adding three types of noise sequences N1a', N1b', and N1c' of the noise sequences read out by the noise sequence readout means 37.

Each of the memories 31a, 31b, 31c and each of the memories 32a, 32b, and 32c are configured by an SRAM capable of reading out at high speed.

Each of the memories 31a, 31b, 31c and each of the memories 32a, 32b, and 32c are used for storing 16 byte data in each address of 32 K ($2^{15}$), for example.

As the noise sequence generating means 33, a method of multiply superposing M series of sequences, thereby generating types of noise sequences is known; Box Muller method (Box, G. E. P and Muller, M. E "A Note on the Generation of Random Normal Deviates." Ann Math. stat. 28, 610–611, 1958) and the like.

Here, as noise sequence generating means 33, white Gaussian noise sequences (N1a, N2a), (N1b, N2b), (N1c, N2c) are generated by employing an algorithm in accordance with the Box Muller method in which there can be obtained characteristics closer to Gaussian normal distribution than a case in which M-series sequences are employed.

That is, two noise sequences U1a and U2a having their probabilities (uniformal distribution) uniformly between 0 and 1 are obtained from a randomizing function, and a pair of white Gaussian noise sequences (N1a, N2a) that are independent of each other and that are non-correlated with each other are computed by the formula below with these noise sequences U1a and U2a being defined as types.

$N1a = (-2\sigma^2 \ln(U1a))^{1/2} \cos(2\pi U2a)$, $N2a = (-2\sigma^2 \ln(U1a))^{1/2} \sin(2\pi U2a)$ where σ denotes a standard deviation, which is set to 1 (this setting is applied, hereinafter)

Similarly, two noise sequences U1b and U2b having probabilities uniformly between 0 and 1 are obtained from a randomizing function, and a pair of white Gaussian noise sequences (N1b, N2b) that are independent of each other and that are non-correlated with each other are computed by the formula below with these noise sequences U1b and U2b being defined as types.

$N1b = (-2\sigma^2 \ln(U1b))^{1/2} \cos(2\pi U2c)$, $N2b = (-2\sigma^2 \ln(U1b))^{1/2} \sin(2\pi U2b)$ Further, two noise sequences U1c and U2c having probabilities uniformly between 0 and 1 are obtained from a randomizing function, and a pair of white Gaussian noise sequences (N1c, N2c) that are independent of each other and that are non-correlated with each other are computed by the formula below with these noise sequences U1c and U2c being defined as types.

$N1c = (-2\sigma^2 \ln(U1c))^{1/2} \cos(2\pi U2c)$, $N2c = (-2\sigma^2 \ln(U1c))^{1/2} \sin(2\pi U2c)$ Then, the digital filter 34 restricts a bandwidth between each of the noise sequences N1a, N1b, and N1c and each of the noise sequences N2a, N2b, and N2c in a bandwidth set by the bandwidth setting means 35.

This bandwidth is set to some multiples of the bandwidths of the digital modulation signals I and Q to be inputted.

Hence, since the digital modulation signals I and Q are baseband signals, the digital filter 34 is characterized by a low pass filter whose lower limit extends to a direct current region.

Each of the noise sequences N1a', N1b', and N1c' and each of the noise sequences N2a', N2b', and N2c' bandwidth restricted by the digital filter 34 having such characteristics are written into each of the memories 31, 31b, and 31c and each of the memories 32a, 32b, and 32c by noise sequence writing means 36.

That is, the noise sequence writing means 36 writes the noise sequence N1a', each code of which is 16 bits, in the memory 31a; writes the noise sequence N1b' in the memory 31b in order of address; writes the noise sequence N1c' in the memory 31c in order of address; writes the noise sequence N2a' in the memory 32a in order of address; writes the noise sequence N2b' in memory 32b in order of address; and writes the noise sequence N2c' in the memory 32c in order of address.

In this way, the noise sequences N1a', N1b', and N1c' written into the memories 31a, 31b, and 31c are non-correlated with each other, these noise sequences being generated by defining the respective noise sequences as types, and this probability density distribution is approximate to the Gaussian normal distribution.

Similarly, the noise sequences N2a', N2b', and N2c' written into the memories 32a, 32b, and 32c are non-correlated with each other, these noise sequences being generated by defining the respective noise sequences as types, and this probability density distribution is approximate to Gaussian normal distribution.

Therefore, a series of sequences obtained by adding each of the noise sequences N1a, N1b', and N1c' in units of codes and a series of sequences obtained by adding each of the noise sequences N2a', N2b', and N2c' in units of codes are white Gaussian noise sequences that are further approximate to Gaussian normal distribution.

However, after a readout procedure for writing each of the noise sequences N1a', N1b', and N1c' in order, from a start address to an end address of each of the memories 31a, 31b, and 31c, has been repeated reading out these sequences in order, from the start address to the end address, and then, returning to the start address, the period of sequences having the noise sequences N1a', N1b', and N1c' added thereto is equal to a length of address (32K) of the memories 31a, 31b, and 31c. In the case where readout is performed at a clock speed of 32 MHz, the period is a very short one of about 1/1000 seconds.

This applies to a case of reading out each of the noise sequences N2a', N2b', and N2c' written into each of the memories 32a, 32b, and 32c.

In this embodiment, code periods between each of the noise sequences N1a', N1b', and N1c' and each of the noise sequences N2a', N2b', and N2c' written into the memories 31a, 31b, and 31c and each of the memories 32a, 32b, and 32c are cyclically read out by assuming that the code periods are prime numbers of each other and are close to a total number of addresses between each of the memories 31a, 31b, and 31c and each of the memories 32a, 32b, and 32c, thereby increasing the code period of the added noise sequences.

For example, the total number of addresses in each of the memories 31a, 31, and 31c and each of the memories 32a, 32b, and 332c is 32768, and P1=32749, P2=32719, and P3=32713 can be selected as three numbers that are prime numbers of each other and close to a maximum number 32768 among numbers of 1 to 32768.

Figure 2:
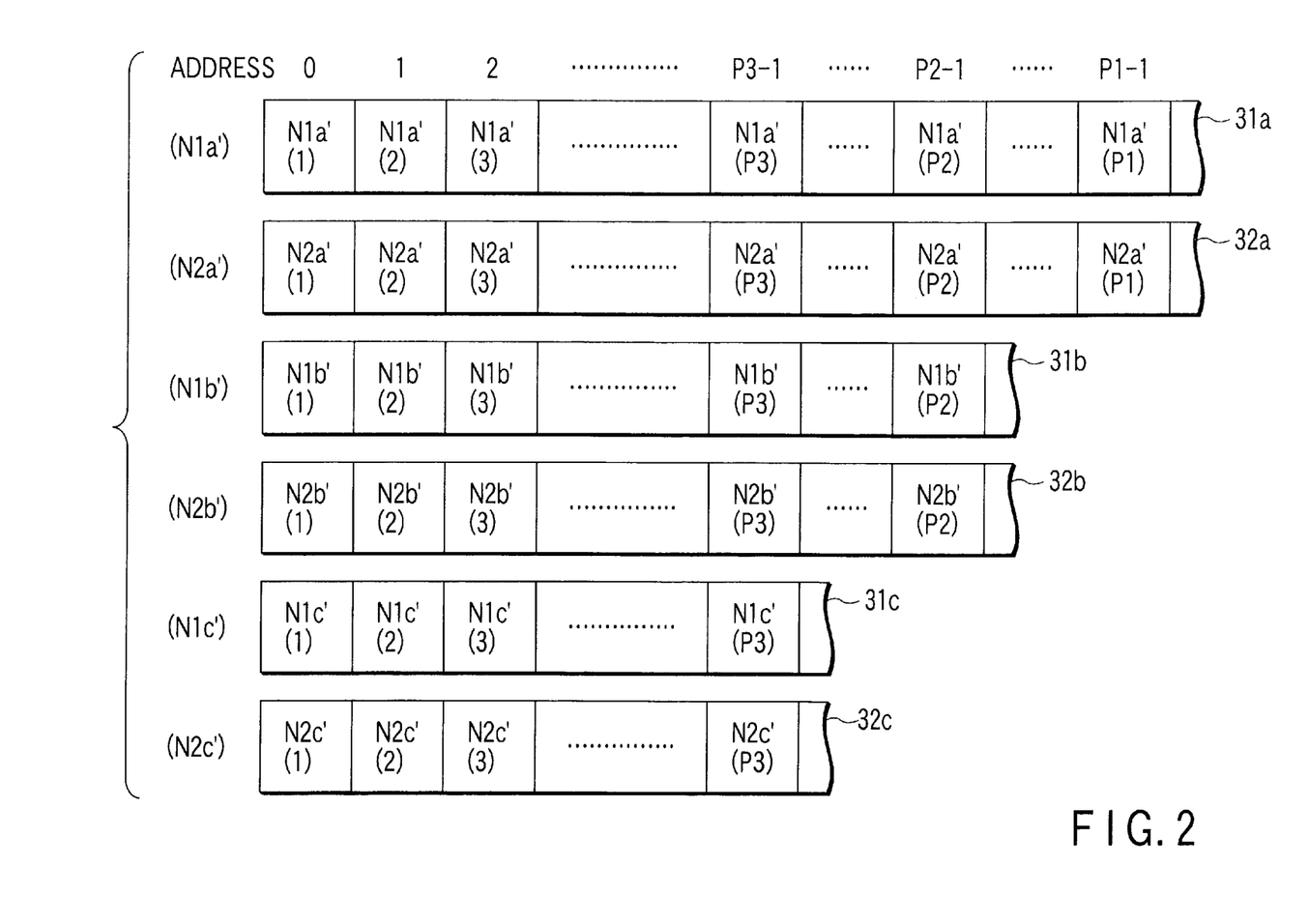
FIG. 2 is a view showing data contained in each memory shown in FIG. 1.

As shown in FIG. 2, the noise sequence writing means 36 sequentially writes the noise sequences N1a' (1) to N1a' (P1) and N2a' (1) to N2a' (P1) respectively in the range from at least address 0 to P1−1 (=32748) of each of the memories 31a and 32a; sequentially writes the noise sequences N1b' (1) to N2b' (P2) and N2b' (1) to N2b' (P2) respectively in the range from at least address 0 to P2−1 (=32718) of each of the memories 31b and 32b; and sequentially writes the noise sequences N1c' (1) to N1c' (P3) and N2c' (1) to N2c' (P3) respectively in the range from at least address 0 to P3−1 (=32712).

Figure 3:
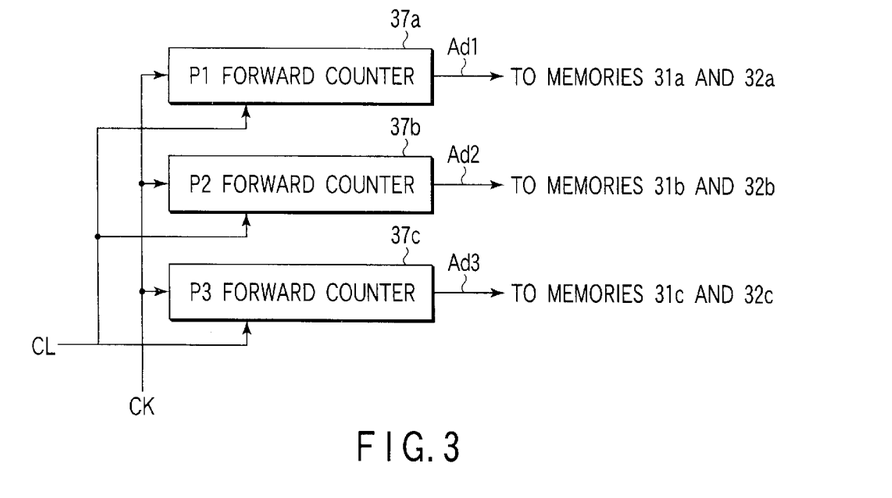
FIG. 3 is a view showing a general configuration of essential portions shown in FIG. 1.
Figure 4A:
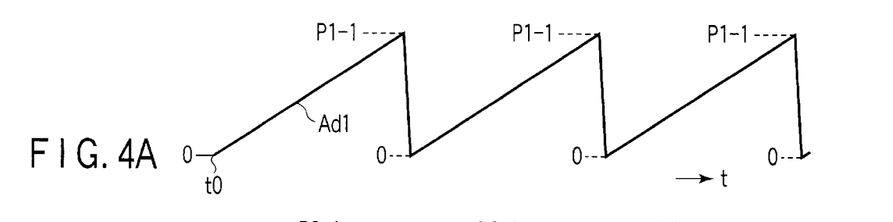
FIG. 4A, FIG. 4B, and FIG. 4C are views each illustrating an operation of the essential portions shown in FIG. 1.
Figure 4B:
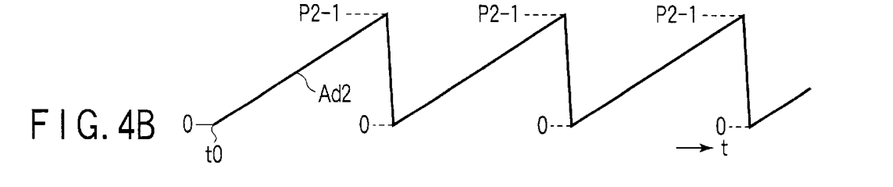
Figure 4C:
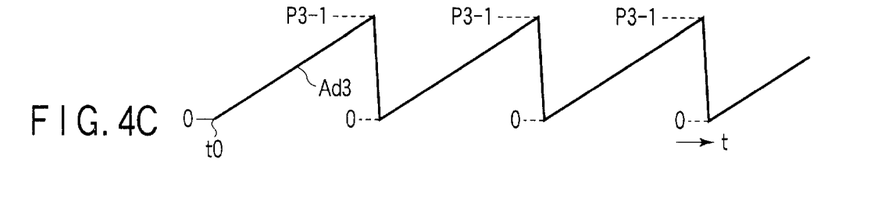

On the other hand, the noise sequence readout means 37 comprises, for example, a P1 forward counter 37a, a P2 forward counter 37b, and a P3 forward counter 37c for counting a readout clock CK (for example, 32 MHz), as shown in FIG. 3. As shown in FIG. 4A, the readout address of each of the memories 31a and 32a is specified by a count output Ad1 of the P1 forward counter 37a that repeats monotonous increase from 0 to P1−1. As shown in FIG. 4B, the readout address of each of the memories 31b and 32b is specified by a count output Ad2 of the P2 forward counter 37b that repeats monotonous increase from 0 to P2−1. As shown in FIG. 4C, the readout address of each of the memories 31c and 32c is specified by a count output Ad3 of the P3 forward counter 37c that repeats monotonous increase from 0 to P3−1.

The P1 forward counter 37a, P2 forward counter 37b, and P3 forward counter 37c are reset by a reset signal CL when a readout operation is started (at the time of t0).

By specifying this readout address, the sequences within the range of address 0 to P1−1 (=32748) are cyclically read out relevant to the memories 31a and 32a; the sequences within the range of address 0 to P2−1 (=32718) are cyclically read out relevant to the memories 31b and 32b; and the sequences within the range of address 0 to P3−1 (=32712) are cyclically read out relevant to the memories 31c and 32c.

This readout clock CK is in synchronization with the digital modulation signal rows I and Q to be inputted.

Figure 5:
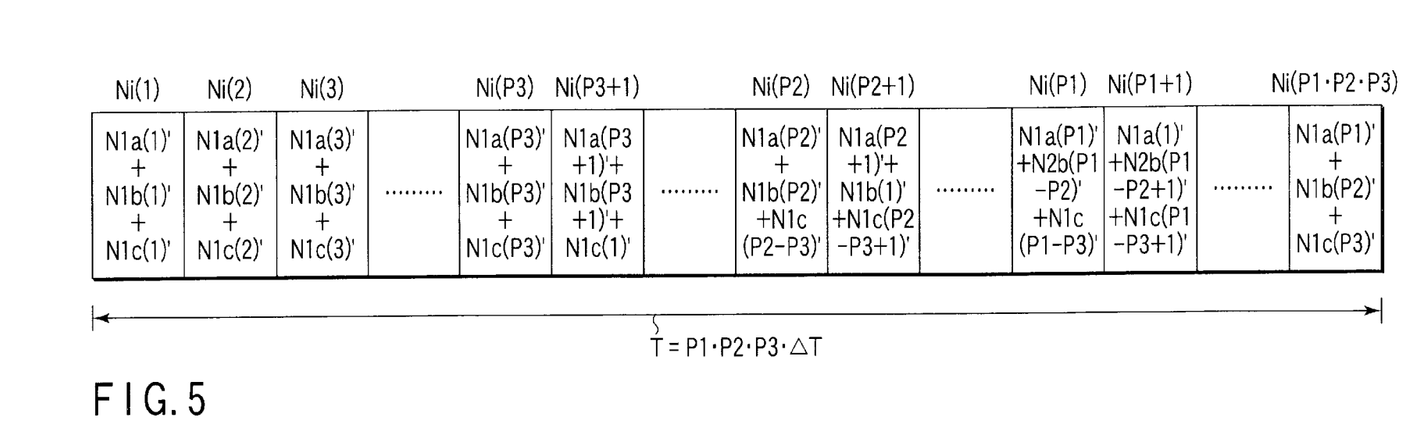
FIG. 5 is a view showing output data of the essential portions shown in FIG. 1.

In this way, each of the noise sequences N1a', N1b', and N1c' and each of the noise sequences N2a', N2b', and N2c' read out from each of the memories 31a, 31b, 31c and each of the memories 32a, 32b, and 32c in synchronization with the readout clock CK are added by the sequence adders 38 and 39, respectively, and the addition results are outputted as a series of noise sequences N1 and Nq, as shown in FIG. 5, for example.

The code period T of the noise sequence Ni outputted from the sequence adder 38 is obtained as P1·P2·P3·ΔT when the period of the readout clock CK is defined as ΔT, as shown in FIG. 5. As described previously, when P1=32749, P2=32719, P3=32713, and the frequency of the readout clock CK is defined as 32 MHz, the code period T of the noise sequence Ni is obtained as about 12 days, and irregularities up to several days are well maintained.

Although not shown, the code period of the noise sequence Nq outputted from the sequence adder 39 is also identical to the code period T of the noise sequence Ni.

As described previously, this noise sequence Ni is added with an output I' of an adder 21 by means of a CD adder 25, and the addition result is output as a reference signal Ri. The noise sequence Nq is added with an output Q' of an adder 22 by means of a CN adder 26, and the addition result is outputted as a reference signal Rq.

These two reference signals Ri and Rq are obtained by digitally adding a level-secured white Gaussian noise sequences Ni and Nq to digital modulation signal rows I' and Q' each set to an arbitrary level by a value A set to a CN setting register 23. Thus, a CN ratio is arbitrarily varied according to the setting value A of the CN setting register 23. Moreover, the digital modulation signal rows I' and Q' are basebands, and are free of a time-based level change caused by frequency conversion processing. In addition, the noise sequences Ni and Nq are digitally generated, free of a time-based level change, and have characteristics that are very close to Gaussian normal distribution. Thus, the level ratio of these, i.e., the CN ratio accurately corresponds to the setting value A, and the reliability of the CN ratio is high.

Figure 6:
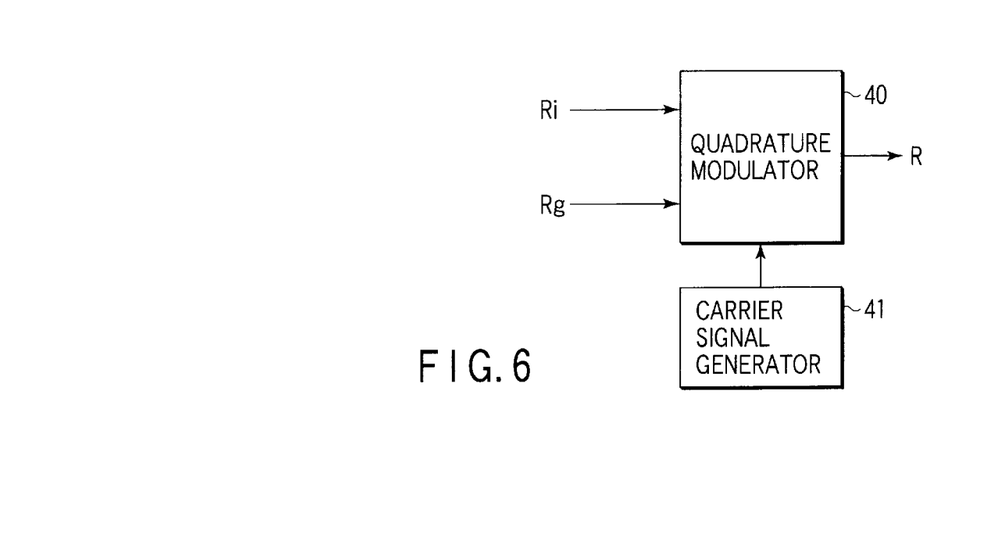
FIG. 6 is a view showing a configuration for frequency converting an output of the CN controller shown in FIG. 1.

In the case of obtaining a reference signal R of an RF bandwidth or IF bandwidth from these two reference signals Ri and Rq, as shown in FIG. 6, the reference signals Ri and Rq are inputted to a quadrature modulator 40, and are frequency-converted and combined by a carrier signal from a carrier signal generator 41.

The CN ratio of the reference signal R in the RF bandwidth or IF bandwidth depends on the CN ratio of the reference signals Ri and Rq, and is not affected by the level change caused by the carrier signal generator 41 or frequency characteristics of the quadrature modulator 40. Thus, the change caused by time is reduced, and measurement with high reliability can be performed at a preset CN ratio.

This CN controller 20 is controlled by control means (not shown) so that the noise sequence generating means 33 generates a noise sequence at an initial state of the entire system, for example, (when power is supplied, for example), and readout caused by the noise sequence readout means 37 is started at an arbitrary timing after this noise sequence has been written in each of the memories 31a, 31b, 31c, 32a, 32b, and 32c.

In the above described embodiment, the noise sequences Ni and Nq outputted from the sequence adders 38 and 39 are directly outputted to the CN adders 25 and 26 so as to be added with outputs of the multipliers 21 and 22.

Figure 7:
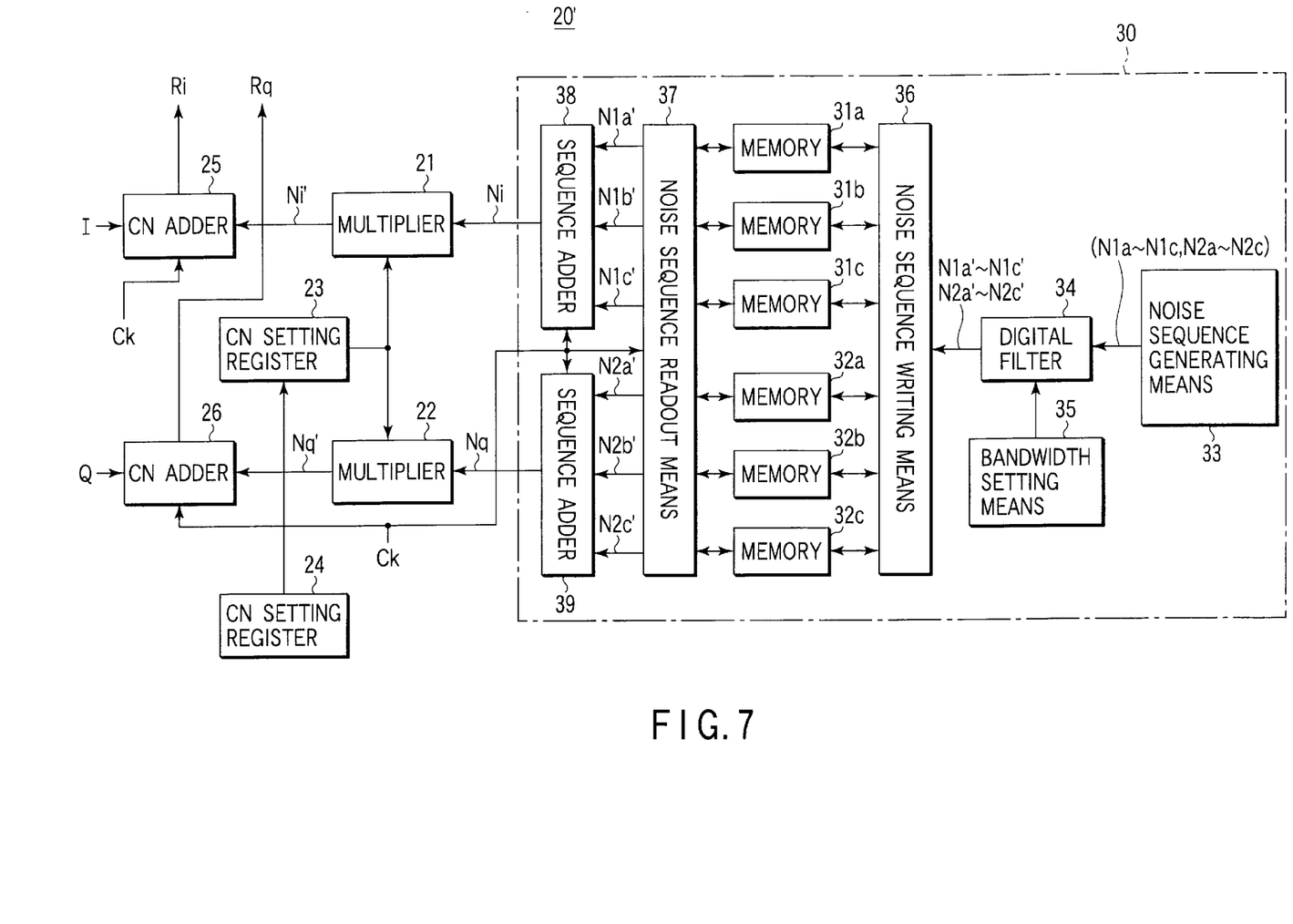
FIG. 7 is a block diagram depicting a configuration of a CN controller according to another embodiment of the present invention.

Hence, as in the CN controller 201 shown in FIG. 7, the multipliers 21 and 22 are inserted respectively between the sequence adder 38 and the CN adder 25 and between the sequence adder 39 and the CN adder 26. Then, the noise sequences Ni and Nq outputted from the sequence adders 38 and 39 are multiplied by a setting value B set from the CN setting means 24 to the CN setting register 23 in order to determine the noise amplitude. The multiplication results Ni1 and Nq1 and the digital modulation signal rows I and Q to be inputted are added respectively by means of the CN adders 25 and 26 so that the addition results may be outputted as reference signals Ri and Rq.

In this case as well, the two reference signals Ri and Rq are obtained by digitally adding level-secured digital modulation signal rows I and Q to white Gaussian noise sequences Ni' and Nq' each set to an arbitrary level according to the value B set by the CN setting register. Thus, the CN ratio can be arbitrarily varied according to the setting value B of the CN setting register 23. Moreover, the digital modulation signal rows I and Q are basebands, and are free of a level change caused by frequency conversion processing. In addition, the noise sequences Ni' and Nq' are also digitally generated, are free of a level change, and have characteristics that are very close to Gaussian normal distribution. Thus, the level ratio of these, i.e., the CN ratio, accurately corresponds to the setting value B, and the reliability of the CN ratio is high.

In addition, although there has been described a CN controller that changes a CN ratio relevant to dual-phase digital modulation signals I and Q, the present invention is similarly applicable to a single series of digital modulation signal rows.

In this case, there can be eliminated a configuration relevant to one digital modulation signal row side (for example, Q side) of one of the CN controllers 20 and 20' (multiplier 22, CN adder 26, memories 32, 32b and 32c, and sequence adder 39).

In addition, at the aforementioned noise generating section 30, although a white Gaussian noise sequence has been generated by employing an algorithm in accordance with the Box Muller method, M series of noise sequences are multiplied, thereby computing the white Gaussian noise sequences as described previously, and the computation results are stored in each of the memories 31a, 31b, 31c, 32a, 32b, and 32c so that the results may be read out and added in the same way as described previously.

In addition, the aforementioned noise generating section 30 generates a white Gaussian noise sequence to be added to a digital modulation signal.

In place of this section, in the case of a noise generator for adding a phasing noise, plural types of noise sequences in $X^2$ distribution are obtained by a predetermined computation, and are stored in a plurality of memories so that these sequences can be cyclically read out and added at code periods that are prime numbers of each other in the same manner as described previously. In this case as well, a phasing noise that does not have long-time regularity can be added.

Further, the CN controller 20 adds an output No of the sequence adder 38 of the noise generating section 30 and an output I' of the multiplier 21 to each other by means of the CN adder 25, and adds an output Nq of the sequence adder 39 of the noise generating section 30 and an output Q' of the multiplier 22 by means of the CN adder 26.

Hence, the CN adder 25 and the sequence adder 38 may be configured as one adder, and the CN adder 26 and the sequence adder 39 may be configured as one adder.

In addition, at the above noise generating section 30, the noise sequences N1a, N1b, N1a, N2a, N2b, and N2c generated by noise sequence generating means 33 are bandwidth-restricted by means of the digital filter 34 so as to be written into each of the memories 31a, 31b, 31c, 32a, 32b, and 32c, thereby making it possible to use a digital filter having a processing speed lower than its readout speed.

Hence, the digital filter 34 is inserted into an input side or an output side of each of the sequence adders 38 and 39, thereby to be bandwidth-restricted to each noise sequence to be inputted to the sequence adders 38 and 39 or each noise sequence to be outputted from the sequence adders 39 and 39.

However, in this case, it is required to employ a plurality of digital filters capable of high speed processing that correspond to a readout speed (32 MHz in the above example).

In addition, at the aforementioned noise generating section 30, each of the noise sequences N1a, N1b, and N1c and each of the noise sequence N2a, N2b, and N2c generated by the noise sequence generating means 33 are written into each of the memories 31a, 31b, and 31c and each of the memories 32a, 32b, and 32c.

Hence, each of the once-generated noise sequences N1a, N1b, and N1c and each of the once-generated noise sequence N2a, N2b, and N2c may be written into a ROM so as to be read out after being written into each of the memories 31a, 31b, and 31c and each of the memories 32a, 32b, and 32c at the time of initialing the operation. Alternatively, each of the noise sequences N1a, N1b, and N1c and each of the noise sequences N2a, N2b, and N2c are written into a plurality of ROMs so that each of the noise sequences N1a, N1b, and N1c and each of the N2a, N2b, and N2c read out from each ROM may be added to each other.

As has been described above, a noise sequence generator according to a first aspect of the present invention comprises: a plurality of memories each storing plural types of noise sequences that are non-correlated with each other; noise sequence readout means for reading out the noise sequences stored in the plurality of memories so that their code periods are prime numbers of each other; and sequence adding means for adding noise sequences read out from the plurality of memories in parallel by the noise sequence readout means, thereby outputting the addition result as a series of noise sequences.

Thus, the noise sequence generator according to the first aspect of the present invention is capable of is generating a noise sequence having a long code period and being free of a time-based level change.

A CN controller according to a second aspect of the present invention comprises: a register; setting means for setting a value to determine an amplitude of a digital modulation signal row to the register; multiplying means for multiplying the setting value of the register by a to-be-inputted digital modulation signal row; a plurality of memories each storing white Gaussian noise sequences that are non-correlated with each other; noise sequence readout means for reading out the noise sequences stored in the plurality of memories so that their code periods are prime numbers of each other; sequence adding means for adding noise sequences read out in parallel from the plurality of memories by the noise sequence readout means, thereby outputting the addition result as a series of noise sequences; and CN adding means for adding and outputting the series of noise sequences to an output from the multiplying means.

Thus, the CN controller according to the second aspect of the present invention digitally adds a level-secured white Gaussian noise sequence to a digital modulation signal row set at an arbitrary level according to the register setting value. Thus, the CN ratio can be arbitrarily varied according to the setting value of the register, and moreover, a baseband free of a time-based level change caused by frequency conversion processing can be employed as a digital modulation signal row to be inputted. In addition, a noise sequence is also digitally generated, is free of a time-based level change, and has characteristics very close to Gaussian normal distribution. Thus, the level ratio of these, that is, the CN ratio accurately corresponds to the setting value, and the reliability of setting the CN ratio can be remarkably enhanced.

A CN controller according to a third aspect of the present invention comprises: a plurality of memories each storing white Gaussian noise sequences that are non-correlated with each other; noise sequence readout means for reading out the noise sequences stored in the plurality of memories so that their code periods are prime numbers of each other; sequence adding means for adding noise sequences read out in parallel from the plurality of memories by the noise sequence readout means, thereby outputting the addition result as a series of noise sequences; a register; setting means for setting a value to determine an amplitude of the series of noise sequences to the register; multiplying means for multiplying the setting value of the register by a series of noise sequences to be outputted from the sequence adding means; and CN adding means for adding a to-be-inputted digital modulation signal row to an output from the multiplying means, and outputting the addition result.

Thus, the CN controller according to a third aspect of the present invention digitally adds a level-secured digital modulation signal row to a white Gaussian noise sequence set at an arbitrary level according to the setting value of the register. Thus, the CN ratio can be arbitrarily varied according to the setting value of the register. Moreover, the digital modulation signal row is a baseband, and is free of a time-based level change caused by frequency conversion processing. In addition, a noise sequence is also digitally generated, is free of a time-based level change, and has characteristics very close to Gaussian normal distribution. Thus, the level ratio of these, that is, the CN ratio accurately corresponds to the setting value, and the reliability of setting the CN ratio can be remarkably enhanced.

In addition, a CN controller according to a fourth aspect of the present invention encompasses a CN controller according to the second and third aspects using a noise sequence generator according to the first aspect. This CN controller comprises: a noise sequence generator according to the first aspect; and CN control means for applying a predetermined CN control to the digital modulation signal row to be CN controlled based on a series of noise sequences from the noise sequence generator.

What is claimed is:

1. A noise sequence generator comprising:
   a plurality of memories each storing plural types of noise sequences that are non-correlated with each other;
   noise sequence readout means for reading out in parallel the plural types of noise sequences stored in the plurality of memories so that code periods of said noise sequences are prime numbers of each other; and
   sequence adding means for adding said noise sequences read out from the plurality of memories in parallel by the noise sequence readout means, and for outputting an addition result as a series of noise sequences.

2. A noise sequence generator according to claim 1, further comprising:
   noise sequence generating means for generating plural types of the noise sequences that are non-correlated with each other;
   a digital filter for applying a bandwidth restriction to each noise sequence generated by the noise sequence generating means;
   bandwidth setting means for setting a bandwidth of the digital filter; and
   noise sequence writing means for writing into each of the plurality of memories, each of the noise sequences bandwidth restricted by the digital filter, respectively.

3. A noise sequence generator according to claim 2, wherein the noise sequence generating means generates at least three types of noise sequences (N1$a$), (N1$b$), and (N1$c$) as plural types of noise sequences that are non-correlated with each other;
   the noise sequence writing means writes into each of three memories correspondingly each of the noise sequences N1$a'$, N1$b'$, and N1$c'$ bandwidth-restricted by the digital filter; and
   the noise sequence readout means cyclically reads out each of the noise sequences N1$a'$, N1$b'$, and N1$c'$ stored in each of three memories by the noise sequence writing means.

4. A noise sequence generator according to claim 3, wherein the sequence adding means is composed of sequence adders for digitally adding three types of noise sequences N1$a'$, N1$b'$, and N1$c'$ of the noise sequences read out by the noise sequence readout means.

5. A noise sequence generator according to claim 4, wherein the noise sequence generating means generates six types and three pairs of noise sequences (N1$a$, N2$a$), (N1$b$, N2$b$), and (N1$c$, N2$c$) as plural types of noise sequences that are non-correlated with each other;
   the noise sequence writing means writes in each of six memories correspondingly each of noise sequences N1$a'$, N1$b'$, and N1$c'$, and each of N2$a'$, N2$b'$, and N2$c'$ bandwidth-restricted by means of the digital filter; and
   the noise sequence readout means reads out in parallel and cyclically each of the noise sequences N1$a'$, N1$b'$, and N1$c'$ and each of the noise sequences N2$a'$, N2$b'$, and N2$c'$ stored in six memories by the noise sequence writing means.

6. A noise sequence generator according to claim 5, wherein the sequence adding means comprises:
   a first sequence adder for digitally adding three types of noise sequences N1$a'$, N1$b'$, and N1$c'$ of the noise sequences read out by the noise sequence readout means; and
   a second sequence adder for digitally adding three types of noise sequences N2$a'$, N2$b'$, and N2$c'$ of the noise sequences read out by the noise sequence readout means.

7. A CN controller comprising:
   a noise sequence generator including:
      a plurality of memories each storing a plural types of noise sequences that are non-correlated with each other;
      noise sequence readout means for reading out in parallel the plural types of noise sequences stored in the plurality of memories so that code periods of said noise sequences are prime numbers of each other; and
      sequence adding means for adding the noise sequences read out in parallel from the plurality of memories by the noise sequence readout means, and for outputting an addition result as a series of noise sequences; and
   CN control means for receiving the series of noise sequences output from the sequence adding means at one end, for receiving a digital modulation signal row to be CN controlled at another end, and for applying a predetermined CN control to the digital modulation signal row to be CN controlled based on the series of noise sequences.

8. A CN controller according to claim 7, wherein said CN control means comprises:
   a CN setting register;
   CN setting means for setting an amplitude setting value to the CN setting register;
   multiplying means for multiplying the setting value of the CN setting register by the digital modulation signal row to be CN controlled; and
   CN adding means for adding the series of noise sequences output from the sequence adding means to an output from the multiplying means, and for outputting an addition result.

9. A CN controller according to claim 7, wherein said CN control means comprises:

a CN setting register;

CN setting means for setting an amplitude setting value to the CN setting register;

multiplying means for multiplying the setting value of the CN setting register by the series of noise sequences output from the sequence adding means; and CN adding means for adding the digital modulation signal row to be CN controlled to an output from the multiplying means, and for outputting an addition result.

10. A CN controller comprising:

a register;

setting means for setting an amplitude setting value to the register;

multiplying means for multiplying the setting value of the register by a digital modulation signal row to be CN controlled;

a plurality of memories each storing plural types of white Gaussian noise sequences that are non-correlated with each other;

noise sequence readout means for reading out in parallel the plural types of white Gaussian noise sequences stored in the plurality of memories so that code periods of said noise sequences are prime numbers of each other;

sequence adding means for adding the plural types of white Gaussian noise sequences read out in parallel from the plurality of memories by the noise sequence readout means, and for outputting the added plural types of white Gaussian noise sequences as a series of noise sequences; and CN adding means for adding the series of noise sequences output from the sequence adding means to an output from the multiplying means, and for outputting an addition result.

11. A CN controller comprising:

a plurality of memories each storing plural types of white Gaussian noise sequences that are non-correlated with each other;

noise sequence readout means for reading out in parallel the plural types of white Gaussian noise sequences stored in the plurality of memories so that code periods of said noise sequence are prime numbers of each other;

sequence adding means for adding the plural types of white Gaussian noise sequences read out in parallel from the plurality of memories by the noise sequence readout means, and for outputting the added plural types of white Gaussian noise sequences as a series of noise sequences;

a register;

setting means for setting an amplitude setting value to the register;

multiplying means for multiplying the setting value of the register by the series of noise sequences output from the sequence adding means; and CN adding means for adding the series of noise sequences output from the sequence adding means to an output from the multiplying means, and for outputting an addition result.

* * * * *